March 23, 1971 C. L. TANSEL 3,572,295
ANIMAL SECURING GATE
Filed Oct. 6, 1969
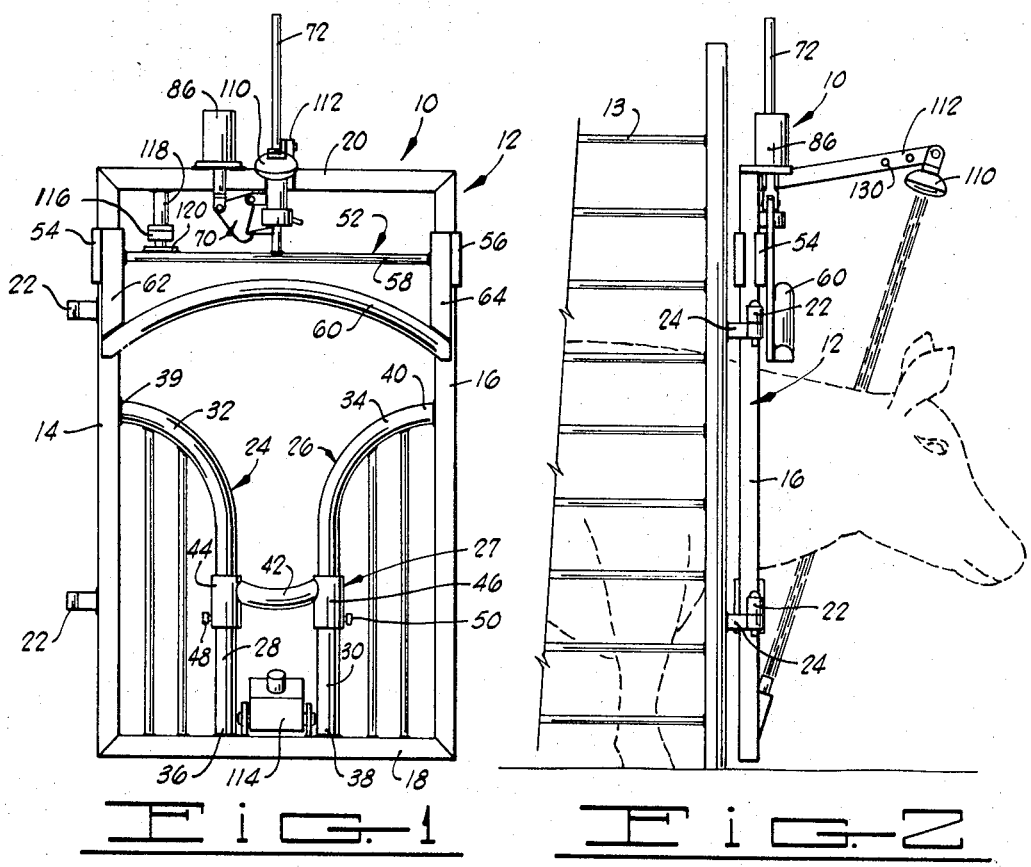
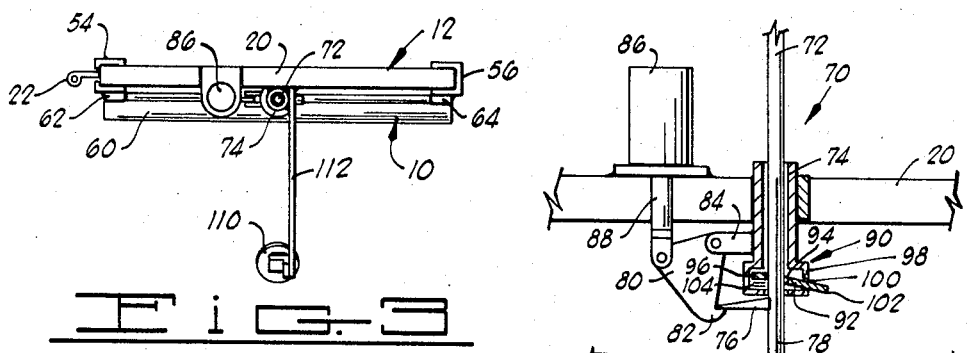
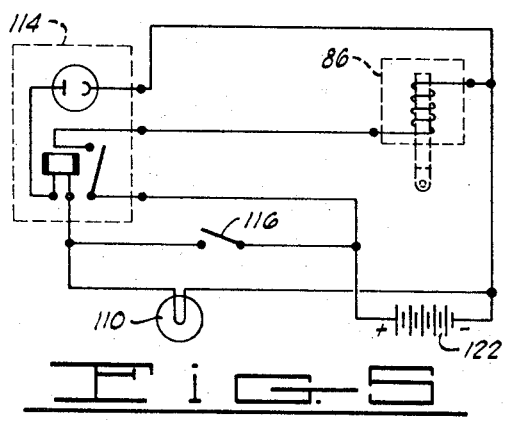
INVENTOR
CECIL L. TANSEL
BY
ATTORNEYS United States Patent Office 3,572,295
Patented Mar. 23, 1971

3,572,295
ANIMAL SECURING GATE
Cecil L. Tansel, Rte. 4, Box 165,
Chandler, Okla. 74834
Filed Oct. 6, 1969, Ser. No. 864,137
Int. Cl. A01k 29/00; A61d 11/00
U.S. Cl. 119—98                                  7 Claims

ABSTRACT OF THE DISCLOSURE

The present invention relates to an animal securing gate adapted to be installed on a stock chute and the like. The gate basically comprises a rectangular frame having means for engaging the lower portion of an animal's neck attached thereto. A movable frame including a neck depressing member positioned in vertically opposed relation to said means for engaging the lower portion of the animal's neck is slidably attached to the frame, and electric means are provided for automatically releasing the movable frame when an animal extends its head and neck through the gate thereby forcing the animal's neck into engagement with the means for engaging the lower portion thereof and securing the animal in the gate.

BACKGROUND OF THE INVENTION (1) Field of the invention

The present invention relates generally to an animal securing gate, and more particularly, but not by way of limitation, to an animal securing gate having means for engaging an animal about the neck thereby securing the animal preparatory to operating on the animal.

(2) Background of the invention

Many various devices have been developed for securing an animal preparatory to operating on the animal in a desired manner, such as dehorning or castrating. Of these apparatus, the gate type, adaptable to be installed on a stock chute and having means engageable about the neck of an animal, have been the most popular. In use of such apparatus, an animal is driven through the chute and caused to extend its head and neck through the gate whereupon means engageable about the neck of the animal are actuated to secure the animal in the gate. After the operation on the animal has been carried out, the neck engaging means are disengaged and the gate opened to release the animal.

Heretofore, such animal securing gates have required manual operation of the neck engaging means associated therewith. Thus, it has been necessary to station an operator at the gate to actuate the means engageable about the neck of an animal, while one or more operators drive the animal through the chute. Since animals such as cattle spook easily, the presence of an operator at the gate makes it more difficult to move the animal into position whereby its head and neck are extended through the gate.

While remotely operated animal securing gates of the type described have been proposed, they have been relatively unsuccessful in that ropes or other manually operated means for actuating the means for engaging the neck of the animal are cumbersome, and often still require more than one operator to successfully secure the animal in the gate in a reasonable time.

By the present invention an animal securing gate is provided whereby a single operator may readily catch and secure an animal.

SUMMARY OF THE INVENTION

The present invention relates to an animal securing gate adapted to be installed on a stock chute or the like having means for engaging an animal about the neck to secure the animal attached thereto. An electric light source is attached to the gate for directing a beam of light across the gate, positioned so that the beam of light is interrupted when an animal extends its head and neck through the neck engaging means. A photoelectric cell actuated switch is attached to the gate, positioned to receive the beam of light, and solenoid actuator means for operating the neck engaging means are attached to the gate and to the neck engaging means. A source of electric current is provided, and circuit means connecting the source of electric current to the light source, the photoelectric cell actuated switch and solenoid actuator means are provided so that when the beam of light is interrupted the photoelectric cell actuated switch delivers electric current to the solenoid actuator means thereby causing the neck engaging means to be operated and the animal secured in the gate.

It is, therefore, a general object of the present invention to provide an animal securing gate.

A further object of the present invention is the provision of an animal securing gate, adapted to be installed on a stock chute and the like, whereby a single operator, acting alone and unassisted, may readily catch and secure an animal in the gate.

Yet a further object of the present invention is the provision of an animal securing gate having means for engaging an animal about the neck which are automatically activated when the animal extends its head and neck through the gate.

Still a further object of the present invention is the provision of an animal securing gate which is self-actuating and thereby does not require an operator stationed at or near the gate whose presence would cause the animal to shy away from the gate.

Another object of the present invention is the provision of an animal securing gate having means for automatically securing any size of animal therein when the animal extends its head and neck through the gate.

Other and further objects, features and advantages of the invention will be apparent from the following detailed description of the invention taken in conjunction with the accompanying drawings.

BRIEF DESCRIPTION OF THE DRAWINGS

FIG. 1 is a front elevational view of the animal securing gate of the present invention;

FIG. 2 is a side elevational view of the animal securing gate of the present invention installed on a conventional stock chute;

FIG. 3 is a top view of the animal securing gate of FIGS. 1 and 2;

FIG. 4 is an enlarged view, partially in section, of a portion of the animal securing gate of the present invention, and FIG. 5 in a wiring diagram of the present invention.

DESCRIPTION OF THE PREFERRED EMBODIMENTS

Referring to FIGS. 1 through 3, the animal securing gate of the present invention is generally designated by the numeral 10. The gate 10 basically comprises a rectangular frame 12 formed of welded metallic tubing or pipe having a pair of side rails 14 and 16, a bottom rail 18 and top rail 20. A pair of hinge members 22 are attached to one of the side rails 16 for attaching the frame 12 to a pair of complementary hinge member 24 (FIG. 2) which are in turn attached to a conventional stock chute 13 or the like.

Means for engaging the lower portion of an animal's neck comprised of a pair of elongated members 24 and 26 and a cross member 27 are attached to the lower portion of the frame 12. The members 24 and 26, preferably formed of metallic pipe of circular shape in cross-section, include straight lower portions 28 and 30 and 90°-curved upper portions 32 and 34, respectively. The straight lower portions 28 and 30 of the members 24 and 26 are positioned a distance apart parallel to each other and parallel to the side rails 14 and 16 of the frame 12, and the lower ends 36 and 38 thereof are attached to the bottom rail 18 of frame 12 in a suitable manner such as by welding. The curved upper portions 32 and 34 of the members 24 and 26 are positioned in a plane coinciding with a plane intersecting the side rails 14 and 16 of the frame 12, and the ends 39 and 40 thereof are welded to the rails 14 and 16, respectively. The cross member 27 comprises a horizontal member 42, preferably formed of pipe of circular shape and cross section, having the ends thereof welded or otherwise attached to a pair of sleeve members 44 and 46. The sleeve members 44 and 46 are disposed over the straight portions 28 and 30 of the members 24 and 26, and include a pair of lock bolts 48 and 50 threadedly disposed therein. As will be understood, the cross member 27 may be secured in any desired position along the length of the straight portions 28 and 30 of the members 24 and 26 by tightening the lock bolts 48 and 50 against the members 24 and 26, respectively. As will be further understood, the members 24, 26 and 27 form a substantially V-shaped surface for engaging the lower portion of an animal's neck.

A movable frame 52 having a neck depressing member 60 attached thereto is slidably attached to the upper portion of the frame 12. The movable frame 52 is comprised of a pair of guide members 54 and 56 slidably secured on side rails 14 and 16 of the frame 12, and connected together by a transverse bar 58. The neck depressing member 60, preferably formed of pipe of circular shape in cross section and curved intermediate to its ends, is attached to the guide members 54 and 56 by a pair of vertically positioned support bars 62 and 64, respectively. The neck depressing member 60 is positioned vertically opposite from the V-shaped surface formed by the members 24, 26 and 27. The neck depressing member 60 and the members 24, 26 and 27, which are mutually opposed and are adjustable vertically relative to each other upon movement of the movable frame 52, are engageable above and below an animal's neck, respectively, to secure the animal in the apparatus 10.

LATCH AND GUIDE ASSEMBLY

A latch and guide assembly generally designated by the numeral 70 is attached to the top rail 20 of the frame 12 and to the transverse bar 58 of the movable frame 52. Referring specifically to FIG. 4, a vertically disposed guide rod 72 is attached to the transverse bar 58 of the movable frame 52. The guide rod 72 is disposed in a vertical guide member 74 which is attached to the top rail 20 of the gate frame 12. A latch catch 76 is attached to the lower end 78 of the guide rod 72. A triangular shaped latching arm 80 provided with a detent 82 at one corner thereof for engaging the latch catch 76 is fulcrumed at an adjacent corner thereof on a lug 84 which is attached to the guide member 74. A solenoid operated actuator 86 having the actuating arm 88 thereof pivotally attached to the third corner of the triangular latching arm 80 is attached to the top rail 20 of the frame 12. The solenoid operated actuator 86 includes an internal tension spring (not shown) acting downwardly on the actuating arm 88 to maintain the detent 82 of the latching arm 80 engaged with the latch catch 76 thereby securing the movable frame 52 in its uppermost position. Upon energization of the solenoid operated actuator 86, which will be described further herein below, the actuating arm 88 thereof is moved upwardly causing the latching arm 80 to be pivoted and the detent 82 to be disengaged from the latch catch 76. The movable frame 52 is thus adapted to be released upon energization of the solenoid operated actuator 86, whereby it falls by its own weight downwardly towards the members 24, 26 and 27 attached to the frame 12.

As the movable frame 52 moves downwardly, the neck depressing member 60, which is carried by the movable frame 52, forces the neck of an animal having its head and neck extended through the gate 10 downwardly into engagement with the members 24, 26 and 27 previously described. As the movable frame 52 moves downwardly the guide rod 72 is also carried downwardly through the guide member 74. Upon reaching a lower pisition in engagement with an animal's neck, the movable frame 52 is prevented from being thrust upwardly by the animal by retaining means generally designated by the numeral 90 attached to the guide member 74.

Referring still to FIG. 4, the retaining means 90 basically comprises a lever 92 having a bore 94 disposed in one end 96 thereof of slightly larger diameter than the outside diameter of the guide rod 72. The guide rod 72 extends through the bore 94 of the lever 92. An enclosure 98 is attached to the lower end of the guide member 74 which includes a slot 100 in one side thereof. The end 96 of the lever 92 is disposed within the enclosure 98 and the other end 102 of the lever 92 extends through the slot 100 outside the enclosure 98 a short distance. The lever 92 is fulcrumed at a point near the end 102 thereof by the slot 100 of the enclosure 98, and a tension spring 104 disposed within the enclosure 98 acts on the other end 96 of the lever 92. The spring 104 urges the end 96 of the lever 92 upwardly thereby causing the inside surfaces of the bore 94 to come into angular friction engagement with the guide rod 72. As will be understood, the spring 104 maintains the lever 92 in angular friction engagement with the guide rod 72 thereby resisting movement of the guide rod 72 in an upward direction. On the other hand, however, movement of the guide rod 72 is a downward direction tends to compress the spring 104 and move the lever 92 downwardly thereby moving the inside surfaces of the bore 94 out of engagement with the guide rod 72. Thus, the retaining means 90 resists upward movement of the guide rod 72, but allows the guide rod 72 to move downwardly relatively freely. As will be further understood, when it is desired to manually move the frame 52 upwardly, the end 102 of the lever 92 may be manually moved upwardly thereby causing the inside surfaces of the bore 94 to be disengaged from the guide rod 72.

AUTOMATIC ACTUATING APPARATUS

Referring again to FIGS. 1 through 3, the apparatus for automatically actuating the animal securing gate 10 when an animal extends its head and neck therethrough comprises a light source 110 which is attached to the top rail 20 of the frame 12 by an arm 112. The light source 110 is positioned a distance away from the top rail 20 and directs a beam of light downwardly and inwardly toward the bottom rail 18 of the frame 12. A conventional photoelectric cell actuated switch assembly 114 is attached to the bottom rail of the frame 12 and positioned to receive the beam of light generated by the light source 110. A conventional contact-type switch 116 is attached to a vertical arm 118 which is in turn attached to the top rail 20 of the frame 12, and the switch 116 is positioned so that when the movable frame 52 is in its uppermost position, it is contacted and closed by a plate 120 attached to the transverse bar 52.

As will become apparent upon studying the wiring diagram of FIG. 5, the closing of the switch 116 will deliver electric current from a source 122 thereof, which may be a source of commercial electric current or a battery, to both the light source 110 and the photoelectric cell actuated switch assembly 114. The photoelectric cell actuated switch 114 is of a type which will be maintained in an open position so long as the beam of light received by the photoelectric cell is uninterrupted. Upon interruption of the beam of light, the switch will be closed thereby delivering electric current to the solenoid operated actuator 86.

OPERATION

The movable gate 52 may be secured in its uppermost position by an operator by moving the end 102 of the lever 92 upwardly to disengage the bore 94 thereof from the guide rod 72 and lifting the movable frame 52 upwardly until the latch catch 76 is engaged by the detent 82 of the latching arm 80. When the movable frame 52 is secured in its uppermost position, the contact switch 116 is closed thereby delivering power to the light source 110 and to the photoelectric cell actuated switch assembly 114.

The operator may then drive an animal through a stock chute or the like towards the animal securing gate 10. Since an operator need not be stationed at or near the animal securing gate 10, the animal will freely advance towards it, and in an attempt to escape from the chute will extend its head and neck through the gate apparatus 10 within the space defined by the neck depressing member 60 and the members 24, 26 and 27. Upon doing so, the animal will interrupt the beam of light generated by the light source 110 and received by the photoelectric cell actuator switch assembly 114.

It should be noted that the light source 110 is positioned by the arm 112 a distance away from the top rail 20 of the frame 12. Thus, the beam of light generated by the light source 110 is directed inwardly towards the bottom rail 18 of the frame 12. This insures that the beam of light will not be interrupted prematurely by an animal, large or small, extending its head and neck through the gate 10. That is, the beam will not be interrupted until the animal's head has passed through the gate and its neck is positioned over the members 24, 26 and 27. It should also be noted that the light source 110 may be moved inwardly if desired by attaching it to the arm 112 in any one of a plurality of holes 130 provided therein, and the photoelectric cell actuated switch assembly 114 may be adjusted accordingly to receive the beam of light generated by the light source 110.

Upon interruption of the beam of light generated by the light source 110, the photoelectric cell actuated switch assembly 114 will deliver electric current to the solenoid operated actuator 86. The actuating arm 88 thereof will in turn be moved upwardly causing the latching arm 80 to pivot about its fulcrum and the latch catch 76 to be disengaged from the detent 82 thereof, The movable frame 52 will then move downwardly by gravity, and the neck depressing member 60 carried thereby will engage the animal's neck forcing it downwardly into engagement with the members 24, 26 and 27 thereby securing the animal within the gate apparatus 10.

Upon release of the movable frame 52, the plate 120 attached to the transverse bar 58 will be moved away from the contact switch 116 causing it to open. Thus, electric current will be cut-off from the light source 110 and the photoelectric cell assembly 114 until the movable frame 52 is again secured in its uppermost position. When it is desired to release the animal from the gate 10, the movable frame 52 may again be latched in its uppermost position and the gate 10 opened.

While a preferred embodiment of the present invention has been described herein, it will be understood by those skilled in the art that the neck engaging means may be arranged in a variety of ways. For example, the neck engaging means may be comprised of a pair of conventional vertical members which are moved together by a suitable solenoid operated actuator similar to 86 to engage the sides of an animal's neck.

The present invention, therefore, is well adapted to carry out the objects and attain the ends and advantages mentioned as well as those inherent therein. While presently preferred embodiments of the invention are given for the purpose of disclosure, numerous changes in the details of construction and arrangement of parts can be made which will readily suggest themselves to those skilled in the art.

What is claimed is:

1. In an animal restraining and securing gate adapted to be installed on a stock chute or the like having means for engaging an animal about the neck to secure the animal in the gate attached thereto, the improvement comprising:
    an electric light source attached to said gate for directing a beam of light across said gate, positioned so that said beam of light is interrupted when an animal extends its head and neck through said animal neck engaging means;
    a photoelectric cell actuated switch attached to said gate and positioned to receive said beam of light;
    solenoid actuating means for operating said animal neck engaging means attached to said gate and attached to said animal neck engaging means;
    a source of electric current; and
    circuit means connecting said source of electric current to said light source, said photoelectric cell actuated switch and said solenoid means for defining an animal actuated restraint means so that when said beam of light is interrupted said photoelectric cell actuated switch delivers electric current to said solenoid actuator means automatically causing said neck engaging means to be operated and the animal secured in the gate.

2. The animal securing gate of claim 1 wherein said electric light source is positioned at a point near the top of the gate and directs said beam of light downwardly and inwardly towards the bottom of the gate.

3. An animal restraining securing gate which comprises:
    a rectangular gate frame adapted to be hinged to a stock chute or the like having top, bottom and side rails;
    means for engaging the lower portion of an animal's neck attached to said gate frame;
    a movable frame slidably attached to said gate frame having a neck depressing member attached thereto, said neck depressing member being in vertically opposed relation to said means for engaging the lower portion of an animal's neck;
    a latching arm pivotally connected to said gate frame and engagable with said movable frame for securing said movable frame in its uppermost position;
    electrically operated animal actuated means attached to said latching arm for automatically pivoting said latching arm out of engagement with said movable frame when an animal extends its head and neck through said gate so that said movable frame is released to move downwardly by gravity to a lower position thereby forcing the animal's neck into engagement with said means for engaging the lower portion thereof for restraining and securing the animal in the gate; and
    releasable means for retaining said movable frame in said lower position attached to said frame.

4. The animal securing gate of claim 1 wherein the electric means for automatically pivoting said latching arm out of engagement with said movable frame comprises:
    an electric light source attached to a rail of said gate frame for directing a beam of light towards an opposite rail thereof, said light source being positioned so that said beam of light is interrupted when an animal extends its head and neck through said gate;
    a photoelectric cell actuated switch attached to the rail of said gate frame opposite from said light source and positioned to receive said beam of light;
    solenoid actuator means attached to said latching arm for pivoting said arm out of engagement with said movable frame;

a source of electric current; and circuit means connecting said source of electric current to said light source and to said solenoid actuator means by way of said photoelectric cell actuated switch so that when said beam of light is interrupted said switch delivers electric current to said solenoid actuating means thereby pivoting said latching arm out of engagement with said movable frame.

5. The animal securing gate of claim 3 which is further characterized to include contact switch means for delivering electric current to said circuit means attached to said gate frame and positioned so that when said movable frame is in its uppermost position said switch means are contacted and closed thereby.

6. The animal securing gate of claim 5 wherein said means for engaging the lower portion of an animal's neck comprises:

a first elongated member curved intermediate to its ends having one end attached to one of said gate frame side rails and the other end attached to the bottom rail thereof;

a second elongated member curved intermediate to its ends having one end attached to the other of said gate frame side rails and the other end attached to the bottom rail thereof;

a cross member attached to said first and second elongated members to form a substantially V-shaped middle portion between said first and second elongated members and said cross member.

7. The animal securing gate of claim 6 wherein said means for retaining said movable frame in said lower position comprises:

a guide member attached to the top rail of said gate frame;

a vertical guide rod attached to said movable frame and disposed within said guide member;

a retaining lever positioned in angular friction engagement with said guide rod pivotally attached to said guide member;

spring biasing means attached to said guide member and attached to said retaining lever so that said retaining lever is maintained in angular friction engagement with said guide rod thereby resisting movement of said guide rod upwardly but allowing said guide rod to move downwardly.

References Cited
UNITED STATES PATENTS

| | | | |
|---|---|---|---|
| 1,517,573 | 12/1924 | Momyer | 119—99 |
| 3,092,871 | 6/1963 | Marshall et al. | 17—1 |
| 3,237,603 | 3/1966 | Markegard | 119—99 |
| 3,260,034 | 7/1966 | Major | 54—24 |
| 3,513,812 | 5/1970 | Iverson et al. | 119—98 |

ALDRICH F. MEDBERY, Primary Examiner

U.S. Cl. X.R.

17—1